US011981305B2

(12) United States Patent
Oehler et al.

(10) Patent No.: US 11,981,305 B2
(45) Date of Patent: May 14, 2024

(54) ELECTROMECHANICALLY DRIVABLE BRAKE PRESSURE GENERATOR

(71) Applicant: Robert Bosch GmbH, Stuttgart (DE)

(72) Inventors: Claus Oehler, Karlsruhe (DE); Mark Boehm, Lehrensteinsfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 66 days.

(21) Appl. No.: 17/779,769

(22) PCT Filed: Oct. 29, 2020

(86) PCT No.: PCT/EP2020/080349
§ 371 (c)(1),
(2) Date: May 25, 2022

(87) PCT Pub. No.: WO2021/110330
PCT Pub. Date: Jun. 10, 2021

(65) Prior Publication Data
US 2023/0001909 A1 Jan. 5, 2023

(30) Foreign Application Priority Data

Dec. 5, 2019 (DE) .................... 10 2019 218 917.2

(51) Int. Cl.
*B60T 13/74* (2006.01)
*B60T 17/08* (2006.01)
(52) U.S. Cl.
CPC ............ *B60T 13/745* (2013.01); *B60T 17/08* (2013.01)

(58) Field of Classification Search
CPC ...... B60T 7/042; B60T 8/4022; B60T 13/745; B60T 13/746
See application file for complete search history.

(56) References Cited

U.S. PATENT DOCUMENTS 7,325,658 B2 * 2/2008 Halasy-Wimmer .... H02K 7/116
188/162
9,145,939 B2 * 9/2015 Giering ............... F16D 65/0006
(Continued)

FOREIGN PATENT DOCUMENTS

DE         19741869 A1    4/1999
DE      102006009959 B3   10/2007
(Continued)

OTHER PUBLICATIONS

International Search Report for PCT/EP2020/080349, dated Jan. 28, 2021.

*Primary Examiner* — Michael Leslie
(74) *Attorney, Agent, or Firm* — NORTON ROSE FULBRIGHT US LLP; Gerard A. Messina

(57) ABSTRACT

An electromechanically drivable brake pressure generator for a hydraulic brake system of a vehicle. The brake pressure generator including a spindle drive unit for converting a rotary movement on the drive side into a translational movement for the purpose of actuating a piston of a hydraulic piston-and-cylinder unit. A gear unit is arranged between the spindle drive unit and an electric drive motor. A drive motor axis and an axis of the spindle drive unit are arranged radially offset from one another. The piston-and-cylinder unit and the electric drive motor are arranged on axially opposite sides of the gear unit.

7 Claims, 2 Drawing Sheets

(56) References Cited

U.S. PATENT DOCUMENTS

| | | | |
|---|---|---|---|
| 9,285,001 B2* | 3/2016 | Son | F16D 55/224 |
| 9,428,169 B2* | 8/2016 | Zhang | B60T 13/745 |
| 9,631,686 B2* | 4/2017 | Takei | F16D 65/56 |
| 10,316,914 B2* | 6/2019 | Loens | B60T 13/588 |
| 10,391,995 B2* | 8/2019 | Ohm | B60T 13/745 |
| 11,377,083 B2* | 7/2022 | Smith | B60T 1/065 |
| 11,760,331 B2* | 9/2023 | Drumm | F16H 25/2454 303/10 |
| 2010/0242469 A1* | 9/2010 | Jungbecker | B60T 13/745 60/594 |
| 2014/0090371 A1 | 4/2014 | Yoshizu et al. | |
| 2019/0092298 A1* | 3/2019 | Bach | B60T 7/04 |
| 2022/0126807 A1* | 4/2022 | Oehler | B60T 13/745 |
| 2022/0348178 A1* | 11/2022 | Oehler | F04B 17/03 |

FOREIGN PATENT DOCUMENTS

| | | |
|---|---|---|
| DE | 102008062180 A1 | 9/2009 |
| DE | 102009060201 A1 | 6/2011 |
| DE | 102013214212 A1 | 2/2014 |
| DE | 102013217745 A1 | 3/2015 |
| DE | 102015205682 A1 | 2/2016 |
| DE | 102014015848 A1 | 4/2016 |
| DE | 102015217530 A1 | 3/2017 |
| DE | 102015226036 A1 | 6/2017 |
| JP | 2009115313 A | 5/2009 |
| JP | 2016088225 A | 5/2016 |
| WO | 2017045804 A1 | 3/2017 |
| WO | 2017194674 A1 | 11/2017 |

* cited by examiner

ELECTROMECHANICALLY DRIVABLE BRAKE PRESSURE GENERATOR

FIELD

The present invention relates to an electromechanically drivable brake pressure generator for a hydraulic brake system of a vehicle, having a spindle drive unit for converting a rotary movement on the drive side into a translational movement for the purpose of actuating a piston of a hydraulic piston-and-cylinder unit, a gear unit being arranged between the spindle drive unit and an electric drive motor. Furthermore, the present invention relates to a vehicle comprising an electromechanically drivable brake pressure generator of this kind.

BACKGROUND INFORMATION

Future drive concepts for automotive vehicles need alternative devices for brake pressure generation, since a negative pressure is no longer available for operation of a conventional vacuum brake booster. The electromechanical brake pressure generators which are under consideration here have been developed for this purpose.

In the case of an electromechanical brake pressure generator of the kind under consideration here, the braking force is generated at the piston-and-cylinder unit with the aid of an electric motor or another suitable electrical drive. Brake pressure generators of this kind may be used not only to provide an auxiliary force but also, in so-called brake-by-wire systems, as the sole way of generating the brake actuation force. For this reason, electromechanical brake pressure generators are particularly advantageous in respect of autonomous driving.

According to the related art relating to electromechanical brake pressure generators of this kind, when the brake pedal is actuated, the manually effected travel of the pedal is measured by way of an electronic pedal travel sensor, and forwarded to an electronic control device. From this, the electronic control device calculates corresponding trigger signals for an electric drive motor. With the aid of a multi-stage transmission, the motor torque is converted to power assistance for the driver. A hydraulic piston-and-cylinder unit converts the force supplied by this booster into hydraulic pressure for braking. In this arrangement, the electromechanical brake pressure generator provides a braking "feel" that is comparable with conventional vacuum brake boosters. In this way, with the aid of the electronic control device, software allows the braking feel to be adapted to marque-specific characteristics of a vehicle.

PCT Patent Application No. WO 2017/045804 A1 describes a generic electromechanical brake pressure generator. The brake pressure generator comprises an electric drive motor that is operatively connected to a spindle drive unit by way of a multi-stage spur gear such that rotation of the electric drive motor causes a translational movement of a spindle of the spindle drive unit for the purpose of operating a main brake cylinder. However, in the radial direction relative to the spindle drive unit, the multi-stage spur gear generates a quite considerable spacing with a relatively small transmission ratio, with the result that the overall assembly of this electromechanical brake pressure generator is of quite considerable bulk.

An object of the present invention is to provide an electromechanically drivable brake pressure generator that is characterized by space-saving transmission of the electromotive drive power for transfer to the spindle drive unit, and a low-cost construction.

SUMMARY

The object may be achieved by an electromechanically drivable brake pressure generator for a hydraulic brake system of a vehicle, in accordance with the present invention. Advantageous developments and embodiments of the present invention are disclosed herein. A vehicle having a hydraulic brake system which comprises the electromechanical brake pressure generator according to the present invention is also provided.

The present invention includes the technical feature that a drive motor axis and an axis of the spindle drive unit are arranged radially offset from one another, and the piston-and-cylinder unit and the electric drive motor are arranged on axially opposite sides of the gear unit.

According to an example embodiment of the present invention, the axis of the spindle drive unit is arranged parallel, but radially adjacent to the drive motor axis. An arrangement of this kind provides the structural unit with greater compactness in the axial direction. In contrast to the piston-and-cylinder unit, which is arranged for example in a valve housing, the electric drive motor is provided outside the valve housing. In this case, the gear unit is arranged between the drive motor and the piston-and-cylinder unit, as seen in the axial direction.

The electric drive motor is provided as an external motor, which consequently does not need any space within the valve housing. As a result, the valve housing can be of smaller construction, thus saving on the space occupied and the material of the valve housing, which is typically made from solid material. As a result, an electromechanically drivable brake pressure generator of this kind can be made smaller and at lower cost.

In a preferred specific example embodiment of the present invention, the gear unit features a planetary gear which is arranged coaxially in relation to the drive motor axis. A planetary gear has the advantage that it is possible to achieve a high transmission ratio, while the space occupied is reduced because of the high power density. In addition, a planetary gear makes little noise.

Because of the rotational degrees of freedom of the gear elements comprising sun wheel, planet wheel, planet carrier and ring gear, a planetary gear is very versatile in respect of its design and transmission ratio.

In a further preferred specific example embodiment of the present invention, the planetary gear features a ring gear on the output side, and this cooperates with a spur gear that drives a spindle of the spindle drive unit. Preferably, the ring gear features an external set of teeth, with the aid of which the ring gear engages with the spur gear. There is thus no need for further spur gears. The number of parts is accordingly reduced. It also becomes possible to make a gear unit of this kind more compact.

Preferably, planet wheels of the planetary gear are configured as stepped planets. A stepped planet is a planet wheel that features at least two different sets of teeth, with different pitch diameters. In this case, the sets of teeth are arranged on particular portions of the stepped planet. The stepped planet may in this case be made in one part or multiple parts. A planetary gear with stepped planets has the advantage here that the number of parts can thus be reduced. In addition, stepped planets have the advantage that the volume of a gear of this kind is smaller than alternative solutions with a comparable overall transmission ratio.

In a further advantageous development of the present invention, the planetary gear is configured to have two stages. The two-stage planetary gear has the advantage that in this case the planet carrier can be configured to float, as a result of which the complexity of the bearing is reduced.

Advantageously, the piston-and-cylinder unit is received in a valve housing opposite which the electric drive motor is mounted. Thus, because of the mounting relative to the valve housing, there is no need to provide any additional option for mounting. For this reason, the electric drive motor and the piston-and-cylinder unit have the same reference point. As a result, there is only negligible relative movement between the two elements. Consequently, wear in the path between the electric drive motor and the piston-and-cylinder unit, resulting from relative movement, is avoided.

In a further advantageous specific example embodiment of the present invention, the electric drive motor features a motor housing which is secured to the valve housing and on which the planet carrier is secured such that it cannot rotate in relation thereto. Thus, the planet carrier is fixedly connected to the motor housing. Accordingly, there is no need to provide additional securing for the planet carrier. In addition, the motor shaft may be mounted on the motor housing. Thus, the motor housing fulfills a number of functions in addition to receiving the drive motor. As a result of securing the motor housing to the valve housing, the above-described single reference point, and the concomitant advantages, can be ensured.

According to a favorable specific example embodiment of the present invention, a motor shaft of the electric drive motor is prolonged to extend into the valve housing, in which a speed sensor is arranged at an opposite axial end to the electric drive motor. The speed sensor is preferably mounted directly on a circuit board. In this case, the speed sensor preferably detects signals of a magnetic element at an axial end face of the motor shaft. Thus, the electronic components may be grouped together and arranged in the region of the electronic control device.

Specific example embodiments of the present invention are presented in the figures and explained in more detail in the description below.

DETAILED DESCRIPTION OF EXAMPLE EMBODIMENTS

Figure 1:
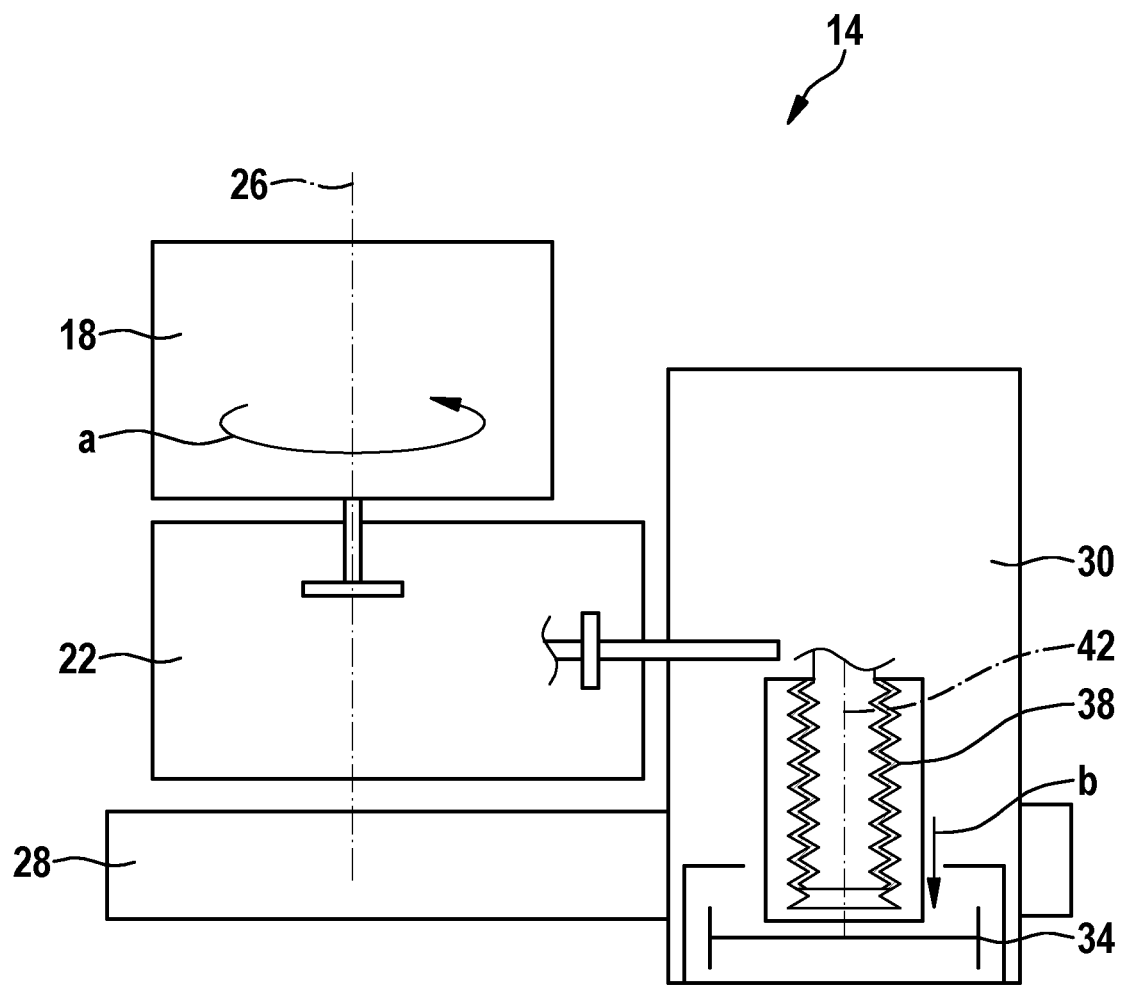
FIG. 1 shows a schematic illustration of an exemplary embodiment of a drive train of an electromechanical brake pressure generator in accordance with the present invention.

FIG. 1 shows a schematic illustration of an exemplary embodiment of a drive train 14 of an electromechanical brake pressure generator in accordance with the present invention. Drive train 14 comprises an electric drive motor 18, with the aid of which a rotary movement a may be generated. Electric drive motor 18 is mechanically connected to a gear unit 22. In this exemplary embodiment, this gear unit 22 is a planetary gear. Planetary gear 22 is positioned coaxially in relation to a drive motor axis 26, and is arranged on a valve housing 28 of the brake pressure generator.

The drive speed of electric drive motor 18 is converted to a slower speed with the aid of planetary gear 22. On an output side, planetary gear 22 is mechanically connected to a hydraulic module 30. Hydraulic module 30 features a piston-and-cylinder unit 34 which, with the aid of an axial translational movement b of a spindle drive unit 38, generates a brake pressure. The drive train 14 that is illustrated in this exemplary embodiment has a biaxial arrangement. This means that an axis 42 of spindle drive unit 38 of hydraulic module 30 is arranged parallel to, and radially offset from, drive motor axis 26.

In this case, electric drive motor 18 is not arranged in valve housing 28 but abuts externally against planetary gear 22. Electric drive motor 18 and piston-and-cylinder unit 34, which is arranged in valve housing 28, are thus positioned on axially opposite sides of gear unit 22. This saves on the space for receiving electric drive motor 18, in valve housing 28, with the result that valve housing 28 can be of smaller configuration.

Figure 2:
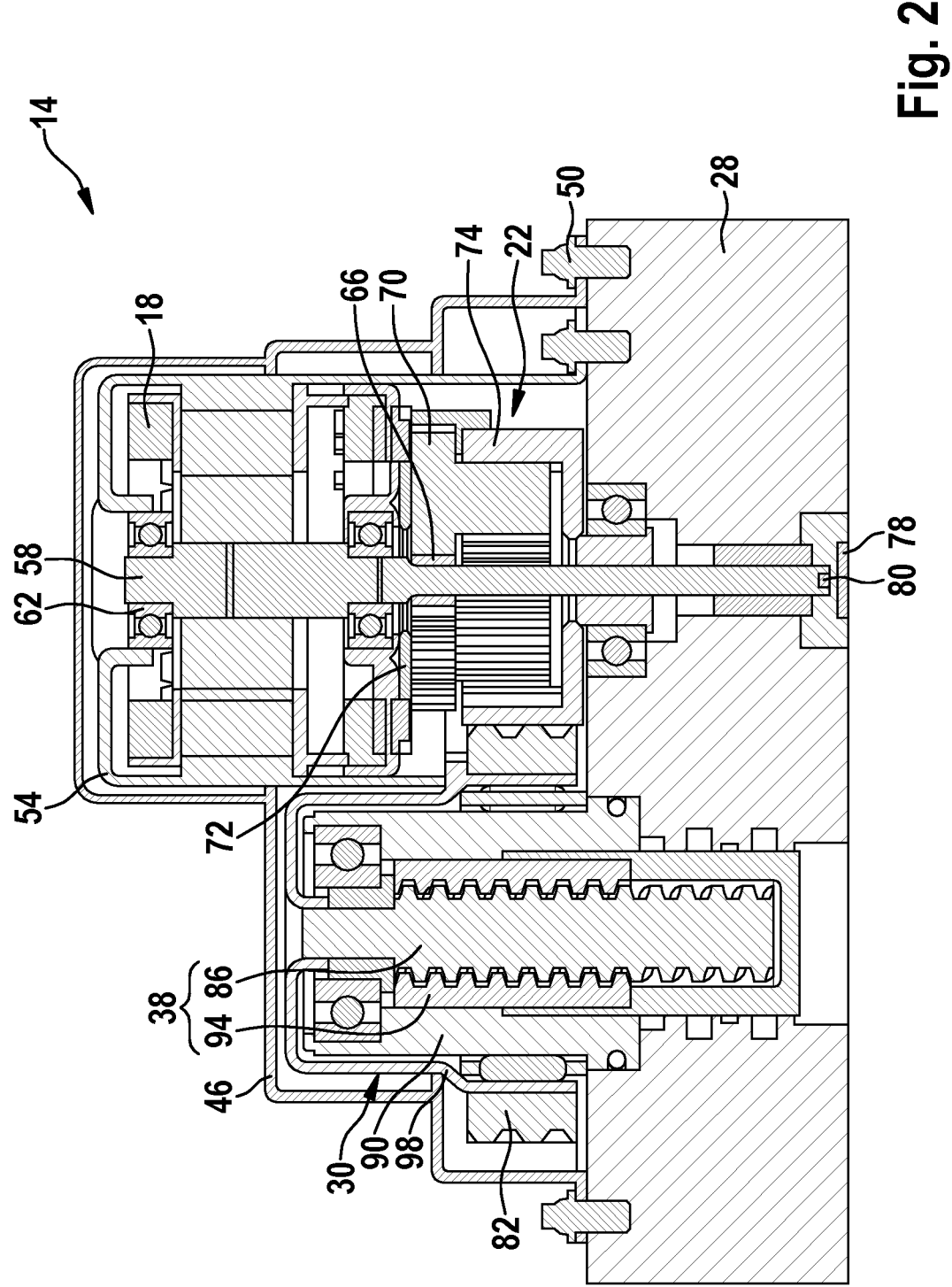
FIG. 2 shows a sectional view of an exemplary embodiment of a drive train of an electromechanical brake pressure generator in accordance with the present invention.

FIG. 2 shows a sectional view of an exemplary embodiment of a drive train 14 of an electromechanical brake pressure generator in accordance with the present invention. In this figure, the drive train 14 that is shown in FIG. 1 is illustrated in more detail. In this exemplary embodiment, hydraulic module 30, electric drive motor 18, and planetary gear 22 are arranged in a common external housing 46, which is connected to valve housing 28 with the aid of securing devices 50. Within this external housing 46, electric drive motor 18 is additionally also arranged in a separate motor housing 54, which is likewise connected to valve housing 28.

Electric drive motor 18 features a motor shaft 58 that is mounted relative to motor housing 54 with the aid of bearings 62. Arranged on motor shaft 58 is a sun wheel 66 of planetary gear 22, which is driven by electric drive motor 18. Sun wheel 66 cooperates with planet wheels 70, which are configured to rotate with the aid of a planet carrier 72 secured to motor housing 54.

In this exemplary embodiment, planet wheels 70 are configured as stepped planets. This means that planet wheels 70 have a larger diameter in a region of engagement with sun wheel 66 than in a region of engagement with a ring gear 74. In this case, ring gear 74 is mounted to be able to rotate in relation to valve housing 28. Motor shaft 58 is prolonged by planetary gear 22 to extend into valve housing 28. At an opposite axial end of motor shaft 58 to electric drive motor 18, a speed sensor 78 is arranged in valve housing 28 and detects the speed of motor shaft 58. In this exemplary embodiment, the speed is detected with the aid of a magnetic element 80 at the axial end of motor shaft 58.

Ring gear 74 features an external set of teeth, with the aid of which ring gear 74 cooperates with a spur gear 82 of spindle drive unit 38 such that spur gear 82 is rotated. In this arrangement, spindle drive unit 38 comprises a spindle 86, which is held such that it can rotate in a spindle drive receptacle 90 that is fixedly connected to valve housing 28. Additionally received in spindle drive receptacle 90 is a spindle nut 94 that engages with spindle 86 such that spindle nut 94 is axially displaceable as spindle 86 rotates.

Spur gear 82 is fixedly connected to a cup-shaped structural element 98 which is mounted such that it can rotate in relation to spindle drive receptacle 90. In addition, structural element 98 is fixedly connected to an end of spindle 86 such that spindle 86 is rotated with the aid of structural element 98, together with spur gear 82.

What is claimed is:

1. An electromechanically drivable brake pressure generator for a hydraulic brake system of a vehicle, comprising:
 a spindle drive unit configured to convert a rotary movement on a drive side into a translational movement to actuate a piston of a hydraulic piston-and-cylinder unit; and
 a gear unit arranged between the spindle drive unit and an electric drive motor;
 wherein a drive motor axis and an axis of the spindle drive unit are arranged radially offset from one another, and the piston-and-cylinder unit and the electric drive motor are arranged on axially opposite sides of the gear unit;
 wherein the piston-and-cylinder unit is received in a valve housing opposite which the electric drive motor is mounted, and
 wherein a motor shaft of the electric drive motor extends into the valve housing, in which a speed sensor is arranged at an opposite axial end to the electric drive motor.

2. The electromechanically drivable brake pressure generator as recited in claim 1, wherein the gear unit includes a planetary gear which is arranged coaxially in relation to the drive motor axis.

3. The electromechanically drivable brake pressure generator as recited in claim 2, wherein the planetary gear includes a ring gear on an output side, and the ring gear cooperates with a spur gear that drives a spindle of the spindle drive unit.

4. The electromechanically drivable brake pressure generator as recited in claim 2, wherein planet wheels of the planetary gear are configured as stepped planets.

5. The electromechanically drivable brake pressure generator as recited in claim 2, wherein the planetary gear is configured to have two stages.

6. The electromechanically drivable brake pressure generator as recited in claim 2, wherein the electric drive motor includes a motor housing which is secured to the valve housing and on which a planet carrier is secured such that it cannot rotate in relation thereto.

7. A vehicle, comprising:
 an electromechanical brake pressure generator for a hydraulic brake system, the electromechanical brake pressure generator including:
  a spindle drive unit configured to convert a rotary movement on a drive side into a translational movement to actuate a piston of a hydraulic piston-and-cylinder unit, and
  a gear unit arranged between the spindle drive unit and an electric drive motor,
  wherein a drive motor axis and an axis of the spindle drive unit are arranged radially offset from one another, and the piston-and-cylinder unit and the electric drive motor are arranged on axially opposite sides of the gear unit;
  wherein the piston-and-cylinder unit is received in a valve housing opposite which the electric drive motor is mounted, and
  wherein a motor shaft of the electric drive motor extends into the valve housing, in which a speed sensor is arranged at an opposite axial end to the electric drive motor.

* * * * *